United States Patent
Huang

(10) Patent No.: US 7,493,600 B2
(45) Date of Patent: Feb. 17, 2009

(54) METHOD FOR VERIFYING BRANCH PREDICTION MECHANISM AND ACCESSIBLE RECORDING MEDIUM FOR STORING PROGRAM THEREOF

(75) Inventor: Cheng-Yen Huang, Hsinchu (TW)

(73) Assignee: Faraday Technology Corp., Hsin-Chu (TW)

( * ) Notice: Subject to any disclaimer, the term of this patent is extended or adjusted under 35 U.S.C. 154(b) by 539 days.

(21) Appl. No.: 10/904,215

(22) Filed: Oct. 29, 2004

(65) Prior Publication Data

US 2006/0041868 A1 Feb. 23, 2006

(51) Int. Cl.
*G06F 9/44* (2006.01)
*G06F 9/30* (2006.01)

(52) U.S. Cl. .................. 717/131; 712/227; 712/237; 712/238

(58) Field of Classification Search ......... 717/124–135; 712/227, 237–238
See application file for complete search history.

(56) References Cited

U.S. PATENT DOCUMENTS

| | | | | |
|---|---|---|---|---|
| 5,963,739 A | * | 10/1999 | Homeier | 717/126 |
| 6,026,477 A | * | 2/2000 | Kyker et al. | 712/2 |
| 6,088,793 A | * | 7/2000 | Liu et al. | 712/239 |
| 6,263,427 B1 | * | 7/2001 | Cummins et al. | 712/236 |
| 6,332,190 B1 | * | 12/2001 | Hara | 712/240 |
| 6,772,410 B1 | * | 8/2004 | Komatsu et al. | 717/124 |
| 6,871,341 B1 | * | 3/2005 | Shyr | 717/131 |
| 2003/0135844 A1 | * | 7/2003 | Yellin et al. | 717/126 |

OTHER PUBLICATIONS

Sonh et al., An implementation of branch target buffer for high performance applications, TENCON '95. 1995 IEEE Region 10 International Conference on Microelectronics and VLSI, Nov. 6-10, 1995, pp. 492-495.*
Velev, A new generation of ISCAS benchmarks from formal verification of high-level microprocessors, Circuits and Systems, 2004. ISCAS '04. Proceedings of the 2004 International Symposium on, vol. 5 May 23-26, 2004, pp. V-213-V-216, IEEE.*
Velev, Using positive equality to prove liveness for pipelined microprocessors, Design Automation Conference, 2004, Proceedings of the ASP-DAC 2004. Asia and South Pacific Jan. 27-30, 2004 pp. 316-321, IEEE.*
Qiao-yan et al., A functional verification method for pipelined DSP, Solid-State and Integrated Circuits Technology, 2004. Proceedings. 7th International Conference on, vol. 3 Oct. 18-21, 2004, pp. 2055-2058, IEEE.*
An implementation of branch target buffer for high performance applications, Seung II Sonh; Hoon Mo Yang; Moon Key Lee, IEEE, 1995, pp. 492-495.*
Formal verification of superscalar microprocessors with multicycle functional units, exceptions, and branch prediction, Velev, M.N.; Bryant, R.E., IEEE, 2000, pp. 112-117.*
Fast branch & bound algorithms for optimal feature selection, Somol, P.; Pudil, P.; Kittler, J., IEEE, vol. 26 Issue: 7, 2004, pp. 900-912.*

* cited by examiner

*Primary Examiner*—Wei Y Zhen
*Assistant Examiner*—Satish S. Rampuria
(74) *Attorney, Agent, or Firm*—Winston Hsu

(57) ABSTRACT

A method for verifying a branch prediction mechanism and an accessible recording medium for storing a verification program are provided. The method is used for verifying the branch prediction mechanism, such as a branch target buffer (BTB), in a processor. The method comprises providing and executing a verification program in the processor. The verification program comprises at least one branch instruction, which determines whether to use a recursive call and execute the verification program according to a given condition.

8 Claims, 2 Drawing Sheets

METHOD FOR VERIFYING BRANCH PREDICTION MECHANISM AND ACCESSIBLE RECORDING MEDIUM FOR STORING PROGRAM THEREOF

BACKGROUND OF THE INVENTION

1. Field of the Invention

The present invention relates to a method for verifying a branch instruction prediction mechanism, and more particularly, to a method for verifying a branch target buffer (BTB) mechanism and an accessible recording medium for storing program thereof.

2. Description of the Related Art

In order to enhance operational efficiency, processors usually use pipeline structures and caches. Under such a structure, errors of fetch instructions will hinder the operational efficiency of the system. While executing a branch instruction, a processor predicts the address of the next instruction so as to access another instruction for executing a next step, such as decoding, in the pipeline. When the prediction is incorrect and the processor accesses a wrong instruction, all of the instructions in the pipeline should be removed and correct instructions need to be input into the pipeline. Accordingly, the branch prediction has great impact on the operational efficiency of the system.

In conventional branch prediction technology, branch target buffer (BTB) mechanism is among the most common branch prediction mechanism. The BTB records the earlier branch instructions and data using the hardware so that the BTB may access a desired branch target instruction therefrom when next branch instruction matches one of the data. Accordingly, branch penalties can be reduced, and the operational delay of the system can be avoided thereby improving the operational efficiency of the system.

For central processing units (CPUs) or digital signal processors (DSPs), the BTB has direct influence on the operational efficiency of the system and the quantity of the data which are processed. Therefore, the efficiency of the BTB should be verified. A conventional verification method comprises various loop verification programs designed according to the structure of the BTB. An acceptable coverage, i.e. the verifiable ratio of status of all branch instructions, is obtained using some patterns. However, the design of the BTB and the structure of the verification method are dependent on each other, thus not all combinations of the branch instructions can be verified. Moreover, when different BTBs are used, additional verification programs are required to match these to-be-verified BTBs. The verification method cannot be designed until the BTB is known. Accordingly, the time for research and development should be extended.

SUMMARY OF THE INVENTION

Accordingly, the present invention is directed to a method of verifying a branch instruction prediction mechanism, such as a branch target buffer (BTB) mechanism. The method is suitable for verifying various branch instruction prediction mechanisms without changing the design of the method. By setting the factor, the time and coverage for verification can be determined.

The present invention is also directed to an accessible recording medium for storing the program for executing the method described above.

The present invention provides a method for verifying a branch instruction prediction mechanism, such as a BTB, of a processor. The method comprises providing and executing a verification program in a processor. The verification program comprises at least one branch instruction, wherein the branch instruction determines whether to use a recursive call to execute the verification program according to a given condition.

According to the method for verifying a branch instruction prediction mechanism of the present invention, the method further comprises providing a factor. The factor determines a coverage according to a status of the branch instruction prediction mechanism which can be verified by the above said verification program.

According to the method for verifying a branch instruction prediction mechanism of the present invention, the above-mentioned condition refers to identifying a relationship between the factor and a target value. The verification program comprises identifying the condition, wherein it is determined whether to store a next instruction address of the branch instruction and the factor in a stack according to the identified condition. The program comprises determining whether to modify the factor according to the identified condition. The program comprises determining whether to execute the branch instruction according to the identified condition. The program comprises retrieving next instruction address of the branch instruction and the factor in the stack. The program comprises returning to the next instruction address of the branch instruction where the verification program is called according to the next instruction address of the retrieved branch instruction.

The present invention also discloses an accessible recording medium for storing a verification program executable in a processor. The verification program is used to verify a branch instruction prediction mechanism in the processor. The verification program comprises a branch instruction which determines whether to use a recursive call to execute the verification program according to a given condition.

According to the accessible recording medium of the present invention, the verification program further comprises setting at least one factor. The factor determines a coverage according to a status of the branch instruction prediction mechanism which can be verified by the verification program. The condition refers to identifying the relationship between the factor and a target value.

By using the recursive call and determining the factor in the present invention, a variety of test patterns are randomly generated to verify the branch instruction prediction mechanism, such as a BTB. Therefore, the method is able to verify various branch instruction prediction mechanisms without changing the design of the method. By setting the factor, the time and coverage for verification can be determined.

The above and other features of the present invention will be better understood from the following detailed description of the embodiments of the invention that is provided in conjunction with the accompanying drawings.

DESCRIPTION OF THE EMBODIMENTS

A branch target buffer (BTB) is a cache-type buffer, serving as an integrated circuit for controlling program operations. The BTB records the past branch instructions and data so that the next branch instruction may access a desired branch target instruction stored in the BTB. Accordingly, the operational delay of the program can be avoided. Therefore, the operational accuracy of the BTB is closely related to the efficiency of the program and the verification program for verifying the BTB is especially important.

Figure 1:
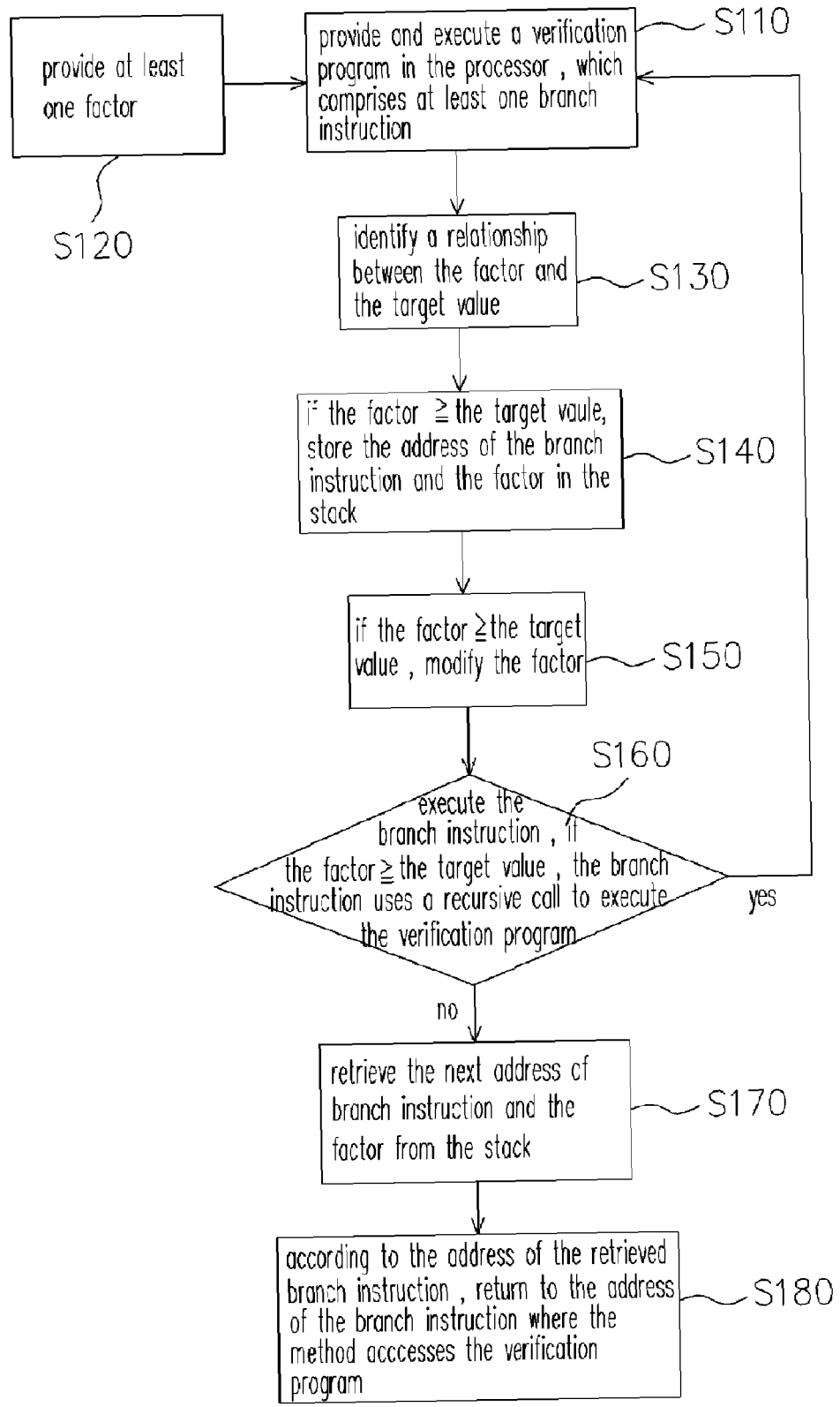
FIG. 1 is a flowchart showing a method for verifying a branch instruction prediction mechanism according to an embodiment of the present invention.

The following is the description of a method for verifying a branch instruction prediction mechanism according to the present invention. FIG. 1 is a flowchart showing a method for verifying a branch instruction prediction mechanism according to an embodiment of the present invention. In this embodiment, the method is used to verify a branch instruction prediction mechanism, such as a BTB, of a processor. Referring to FIG. 1, in step S110, a verification program is provided and executed in a processor. The verification program comprises at least one branch instruction. The branch instruction determines whether to use a recursive call and to execute the verification program according to a given condition.

Before executing the verification program, the method provides at least one factor in step S120. The factor determines a coverage according to a status of the branch instruction prediction mechanism which can be verified by the verification program. In step S130, the relationship between the factor and a target value is identified. According to the identified relationship (whether the factor is larger than or equal to the target value), in step S140, it is determined whether to store the address of the branch instruction and the factor in a stack. In step S150, if the factor is larger than or equal to the target value, the factor is modified, such as deducting the factor by 1. Then in step S160, the branch instruction is executed so as to determine whether to use the recursive call and to execute the verification program according to the identified condition, such as whether the factor is larger than or equal to the target value. If the condition is sustained, the address of the branch instruction is stored in the stack and the verification program is accessed repeatedly, for example, from S110 until the condition is not sustained. Then, the address of the branch instruction stored in the stack is retrieved and the process goes back to this address. The procedure is called a recursion. Therefore, when the factor is smaller than the target value, in step S170, the stored address of the branch instruction and the factor are retrieved from the stack. According to the retrieved address of the branch instruction, the step returns to the address of the branch instruction where the verification program is called in step S180.

Therefore, the branch instructions of the present invention are randomly generated. Accordingly, the design of the BTB can be independent from the verification method. Moreover, the factor can be set according to the desired time and coverage of verification. For example, in step S120, the set factor reaches 95% coverage and requires 15 min verification time. In some embodiments, the set factor reaches 97% coverage and requires 2 hr verification time. In other embodiments, the set factor reaches 99.5% coverage and requires 24 hr verification time. Accordingly, the time and coverage of verification can be determined by the factor. The choice between the time and coverage of verification can be weighed and decided.

In order to illustrate the present invention, the following is the description of an assembly language program for an ARM processor. In this embodiment, two factors are separately stored in the registers r9 and r10. The register r8 serves as the return position after the recursive routine is finished. The register r7 serves as a stack pointer, pointing at the initial position of the stack. The verification program described above can be, for example, a subroutine RECUR. A portion of the main program is described below:

|  | LDR | r7, = STACK |
|  | LDR | r8, = DONE |
|  | STMFD | r7, {r8-r10} |
|  | MOV | r9, #3 |
|  | MOV | r10, #0 |
|  | B | RECUR |
| DONE | . | |
|  | . | |
|  | . | |
|  | LTORG | |
| STACK_BASE | EQU | 0x1000 |
| STACK_SIZE | EQU | STACK_BASE + 0x1000 |
|  | ALIGN | STACK_BASE |
| STACK | ALIGN | STACK_BASE |

"LDR r7, =STACK" means that the address labeled as STACK is stored in the register r7 so as to point out the address of the first data in the stack. "LDR r8, =DONE" means the address labeled as DONE is stored in the register r8 so as to point out the address where the data return from the subroutine RECUR to the main program. "STMFD r7, (r8-r10)" means that the data in the register r8-r10 are stored in the stack, i.e. the address where the register r7 points at. "MOV r9,#3" and "MOV r10,#0" mean that the factors 3 and 0 are stored in the registers r9 and r10, respectively. "B RECUR" first calls the verification program, i.e. the subroutine RECUR. According to the present invention, the program codes of the subroutine RECUR are:

| RECUR | CMP | r9, #2 |
|  | LDRGE | r8, = RETURN3 |
|  | STMGEFD | r7!, {r8-r10} |
|  | SUBGE | r9, r9, #2 |
|  | ADDGE | r10, r10, #1 |
|  | BGE | RECUR |
| RETURN3 | CMP | r9, #1 |
|  | LDRGE | r8, = RETURN2 |
|  | STMGEFD | r7!, {r8-r10} |
|  | SUBGE | r9, r9, #1 |
|  | BGE | RECUR |
| RETURN2 | CMP | r10, #1 |
|  | LDRGE | r8, = RETURN1 |
|  | STMGEFD | r7!, {r8-r10} |
|  | SUBGE | r10, r10, #1 |
|  | BGE | RECUR |
| RETURN1 | CMP | r10, #1 |
|  | LDRGE | r8, = RETURN0 |
|  | STMGEFD | r7!, {r8-r10} |
|  | SUBGE | r10, r10, #1 |
|  | BGE | RECUR |
| RETURN0 | NOP | |
|  | LDMFD | r7!, {r8-r10} |
|  | MOV | PC,r8 |

"CMP r9, #2" identifies the relationship between the factor stored in the register r9 and the target value 2. "LDRGE r8, =RETURN3" and "STMGEFD r7!, (r8-r10)" determine whether to store the next address of the branch instruction "BGE RECUR" and the factors stored in the registers r9 and r10 in the stack according to the identified relationship between the factor and the target value, i.e. whether the factor stored in the register r9 is larger than 2. "SUBGE r9, r9, #2" and "ADDGE r10, r10, #1" are equivalent to step S150. When the factor is larger than or equal to the target value, the factors are modified. In this embodiment, the factor stored in the register r9 is deducted by 2, and the factor stored in the register r10 is added by 1. In step S160, the branch instruction "BGE RECUR" is executed so as to determine whether to use a recursive call and to execute the verification program, i.e. jump to "RECUR", according to the identified relationship between the factor and the target value, i.e. whether the factor is larger than or equal to the target value. That is, if the condition is sustained, the next address of the branch instruction is stored in the stack and the verification program is accessed where, for example, step S110 is repeated. Until the condition is not sustained, the next address of the branch instruction stored in the stacked is retrieved and the step returns to the next address of the branch instruction. It is the so-called recursion.

In this embodiment, the verification program, i.e. the subroutine RECUR, uses the verification methods four times, i.e. comprises four sections: "RECUR~RETURN3", "RETURN3~RETURN2", "RETURN2~RETURN1" and "RETURN1~RETURN0". The difference among these four sections is in identifying the relationship of the factor and the target value and in modifying the factors. For example, "RETURN2" section determines whether factor stored in the register r10 is larger than or equal to 1, deducts the factor stored in the register r10 by 1, and stores the updated data in the register r10. The other sections have the same operations as "RETURN2" section. Detailed descriptions are not repeated. The "RETURN0" section is executed after the four sections either finish the recursion or not execute the recursion if the condition is not sustained. "LDMFD r7!, (r8-r10)" retrieves the next address of the branch instruction and the factor stored in the stack in step S170. Then "MOV PC, r8" stores the retrieved next address of the branch instruction stored in the program counter (PC) of the processor so that the step returns to the next address of the branch instruction where the verification program is called in step S180.

Figure 2:
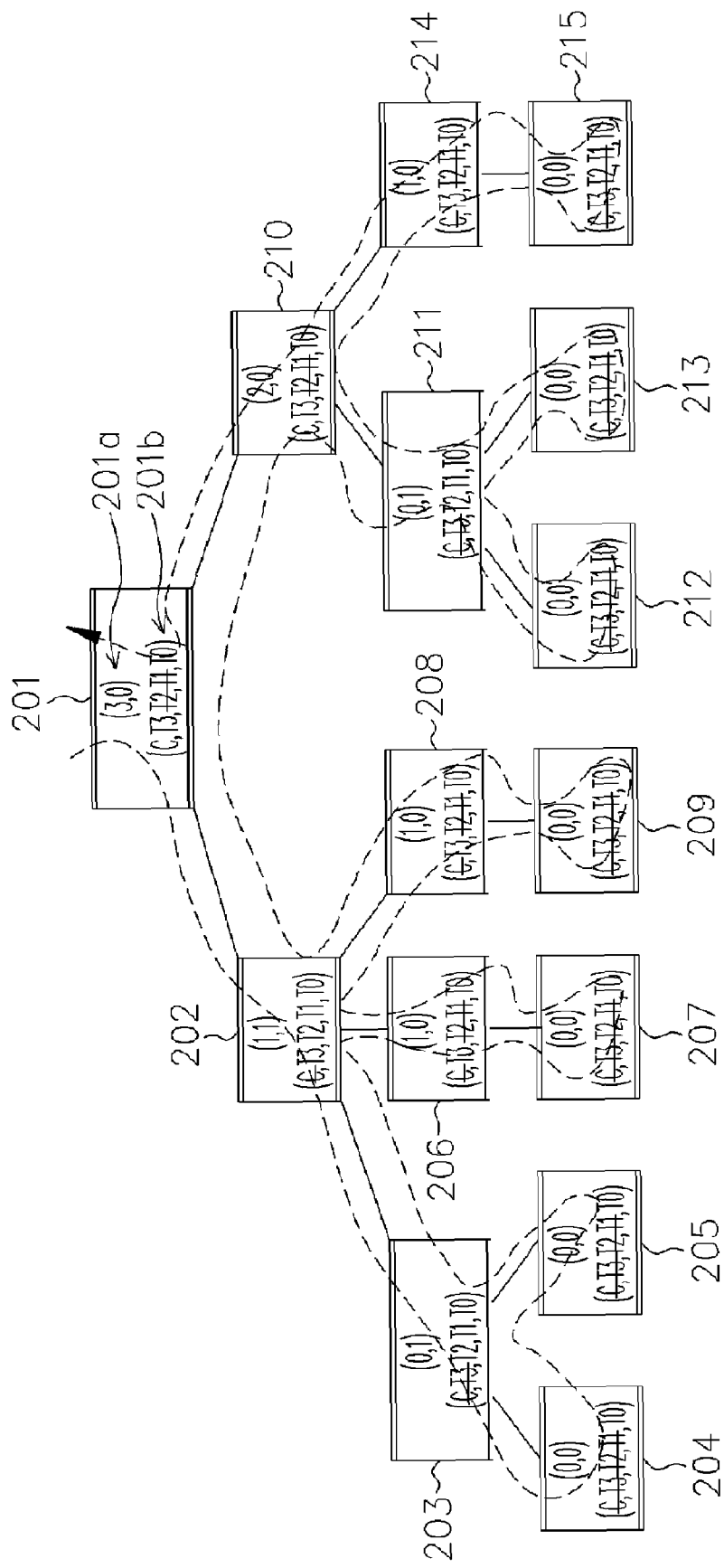
FIG. 2 is a tree diagram of an operation of a verification program according to an embodiment of the present invention.

The following is the description of the operation of the verification program when the factors are set as 3 and 0. FIG. 2 is a tree diagram of an operation of a verification program according to an embodiment of the present invention. Referring to FIG. 2, each block in this diagram represents a recursive/executed verification program, i.e. a subroutine "RECUR", in logical perspective. The upper quotation marks in each block, for example, in the block 201, numbers 201a, represent the factors for the recursion of the verification program. The bottom quotation marks, for example, numbers 201b, represent the identified status of the relationship between the factor and the target value between each section during the recursion step. Wherein, "C" represents "RECUR~RETURN3" section; "T3" represents "RETURN3~RETURN2" section; "T2" represents "RETURN2~RETURN1" section; "T1" represents "RETURN1~RETURN0" section; and "T0" represents the program section below "RETURN0" section. C̶, T̶3̶, T̶2̶, T̶1̶ and T̶0̶ represent the situation that the conditions corresponding to the sections are not sustained. That is, the branch instruction is not taken. In the contrary, C, T3, T2, T1 and T0 represent the situation that the conditions corresponding to the sections are sustained. That is, the branch instruction is taken.

In this embodiment, the factors are set as 3 and 0 and are stored in the registers r9 and r10, respectively. At first, the main program calls and executes the verification program. The block 201 represents the logic status of the verification program. In the block 201, the factor 3 stored in the register r9 is larger than the factor 2 and so the "RECUR~RETURN3" section is executed. The next address, i.e. the address of "RETURN3", of the branch instruction "BGE RECUR" and the factors 3 and 0 in registers r9 and r10 are stored in the stack. The factors are then modified. In this embodiment, the factor stored in the register r9 is deducted by 2, and the factor stored in the register r10 is added by 1. The branch instruction is taken for recursion to execute the verification program. That is, the step returns to "RECUR". In logic perspectives, the block 202 represents the present verification program with factors 1 and 1 during the recursion step.

In the block 202, the factor 1 stored in the register r9 is less than the target value 2. Therefore, "RECUR~RETURN3" section is not taken and the status is presented by C̶. "RETURN3~RETURN2" section is then executed. Because the factor 1 stored in the register r9 is larger than or equal to the target value 1, the next address, i.e. the address of "RETURN2", of the branch instruction "BGE RECUR", and the factors 1 and 1 stored in the registers r9 and r10, respectively, are stored in the stack. The factors are then modified. For example, the factor stored in the register r9 is deducted by 1 and the branch instruction is taken for recursion to execute the verification program. The step returns to "RECUR". In a logic perspective, the block 203 represents the present verification program with factors 0 and 1 during the recursion step.

In the block 203, because the factor stored in the register r9 is 0, "RECUR~RETURN2" sections are not taken, which are represented by C̶ and T̶3̶. "RETURN2~RETURN1" section is then executed. Because the factor 1 stored in the register r10 is larger than or equal to the target value 1, the next instruction address, i.e. the address of "RETURN1", of the branch instruction "BGE RECUR", and the factors 0 and 1 stored in the registers r9 and r10 respectively are stored in the stack. The factors are then modified. For example, the factor stored in the register r10 is deducted by 1 and the branch instruction is taken for recursion to execute the verification program. The step returns to "RECUR". In a logic perspective, the block 204 represents the present verification program with factors 0 and 0 during the recursion step.

In the block 204, because the factors stored in the registers r9 and r10 are 0, "RECUR~RETURN0" sections are not taken, which are represented by C̶, T̶3̶, T̶2̶ and T̶1̶. "RETURN0" section is then executed, which mainly controls the recursion step. Therefore, the branch instruction "MOV PC, r8" must be taken. In this program section, the next address, i.e. the address of "RETURN1", and the factors stored in the stack are retrieved and the process goes back to this address. Referring to FIG. 2, the process goes from block 204 to block 203 and executes "RETURN1" section.

After returning to the block 203, because the factors retrieved from the stack to the registers r9 and r10 are 0 and 1, respectively, steps of "RETURN1" section are taken. Because the factor 1 stored in the register r10 is larger than or equal to the target value 1, the next instruction address, i.e. the address of "RETURN0", of the branch instruction "BGE RECUR", and the factors 0 and 1 stored in the registers r9 and r10 are stored in the stack. The factors are then modified. For example, the factor stored in the register r10 is deducted by 1 and the branch instruction is taken for recursion to execute the verification program. The step returns to "RECUR". In a logic perspective, the block 205 represents the present verification program with factors 0 and 0 during the recursion step.

In the block 205, because the factors stored in the registers r9 and r10 are 0, the operation of the block 205 is similar to that of the block 204. Detailed descriptions are not repeated. In this program section, the next address, i.e. the address of "RETURN0", and the factors stored in the stack are retrieved and the step returns to the address. Referring to FIG. 2, the step goes back from block 205 to block 203 and executes "RETURN0" section. Then the next address, i.e. the address of "RETURN2", and the factors stored in the stack are retrieved and the process goes back to this address. Referring to FIG. 2, the step goes back from block 203 to block 202 and executes "RETURN2" section. The block 206 represents the present verification program with factors 1 and 0 during the recursion step.

Accordingly, one of ordinary skill in the art should understand the recursion of the present invention. Along the dotted line shown in FIG. 2, the process goes through all of the blocks from block 201 to block 215 and then back to block 201. The detailed descriptions are not repeated. Accordingly, whether the branch instructions are taken or not is shown in Table 1. Table 1 is the status of the branch instructions in each program section in the present embodiment with factors 3 and 0.

TABLE 1

| Sequence | C | T3 | T2 | T1 | T0 |
|---|---|---|---|---|---|
| 1 | taken | Taken | taken | not taken | taken |
| 2 | not taken | not taken | not taken | taken | taken |
| 3 | not taken | not taken | not taken | not taken | taken |
| 4 | not taken | not taken | taken | not taken | taken |
| 5 | not taken | Taken | not taken | not taken | taken |
| 6 | not taken | not taken | not taken | taken | taken |
| 7 | not taken | Taken | not taken | not taken | taken |
| 8 | not taken | not taken | not taken | not taken | taken |
| 9 | not taken | Taken | taken | not taken | taken |
| 10 | taken | not taken | not taken | taken | taken |
| 11 | not taken | not taken | not taken | not taken | taken |
| 12 | not taken | not taken | not taken | not taken | taken |
| 13 | not taken | Taken | not taken | not taken | taken |
| 14 | not taken | Taken | not taken | not taken | taken |
| 15 | not taken | not taken | not taken | not taken | taken |
| Total Taken | 2 | 6 | 3 | 3 | 15 |
| Total not taken | 13 | 9 | 12 | 12 | 0 |

According to Table 1, whether the branch instructions C, T3, T2, T1 and T0 are taken or not taken can be identified. With the recursive call in conjunction with the factors, a variety of test patterns can be randomly generated to verify the branch instruction prediction mechanism, such as the BTB. Note that the verification method of the present invention is irrelevant to the design of the branch instruction prediction mechanism. Accordingly, the method is suitable for any branch instruction prediction mechanism.

By setting the factors, the time and coverage of the verification can be determined. In this embodiment, the factors 4 and 0 are adopted and the verification program similar to the above is used. According to the verification program, Table 2 is obtained. Table 2 is the status of the branch instructions in each program section in the present embodiment with factors 4 and 0.

TABLE 2

| Sequence | C | T3 | T2 | T1 | T0 |
|---|---|---|---|---|---|
| 1 | taken | not taken | taken | not taken | taken |
| 2 | taken | not taken | taken | taken | taken |
| 3 | not taken | not taken | not taken | not taken | taken |
| 4 | not taken | not taken | not taken | taken | taken |
| 5 | not taken | not taken | taken | not taken | taken |
| 6 | not taken | not taken | not taken | taken | taken |
| 7 | not taken | not taken | not taken | not taken | taken |
| 8 | not taken | Taken | taken | not taken | taken |
| 9 | not taken | Taken | not taken | taken | taken |
| 10 | not taken | not taken | not taken | not taken | taken |

TABLE 2-continued

| Sequence | C | T3 | T2 | T1 | T0 |
|---|---|---|---|---|---|
| 11 | not taken | not taken | taken | not taken | taken |
| 12 | not taken | not taken | not taken | not taken | taken |
| 13 | not taken | Taken | not taken | taken | taken |
| 14 | not taken | not taken | not taken | not taken | taken |
| 15 | not taken | Taken | not taken | not taken | taken |
| 16 | not taken | not taken | taken | not taken | taken |
| 17 | not taken | not taken | taken | taken | taken |
| 18 | taken | not taken | not taken | not taken | taken |
| 19 | not taken | not taken | not taken | not taken | taken |
| 20 | not taken | Taken | not taken | not taken | taken |
| 21 | not taken | Taken | not taken | not taken | taken |
| 22 | not taken | not taken | not taken | taken | taken |
| 23 | not taken | not taken | taken | not taken | taken |
| 24 | taken | not taken | not taken | taken | taken |
| 25 | not taken | not taken | not taken | not taken | taken |
| 26 | not taken | Taken | not taken | not taken | taken |
| 27 | not taken | Taken | not taken | not taken | taken |
| 28 | not taken | not taken | not taken | not taken | taken |
| 29 | not taken | Taken | taken | not taken | taken |
| 30 | taken | Taken | not taken | taken | taken |
| 31 | not taken | not taken | not taken | not taken | taken |
| 32 | not taken | not taken | taken | not taken | taken |
| 33 | not taken | not taken | not taken | not taken | taken |
| 34 | not taken | Taken | not taken | taken | taken |
| 35 | not taken | not taken | not taken | not taken | taken |
| 36 | not taken | Taken | not taken | not taken | taken |
| 37 | not taken | not taken | taken | not taken | taken |
| 38 | not taken | Taken | not taken | taken | taken |
| 39 | taken | not taken | not taken | not taken | taken |
| 40 | not taken | not taken | not taken | not taken | taken |
| 41 | not taken | not taken | not taken | not taken | taken |
| 42 | not taken | Taken | not taken | not taken | taken |
| 43 | not taken | Taken | not taken | not taken | taken |
| 44 | not taken | not taken | not taken | not taken | taken |
| Total Taken | 6 | 15 | 11 | 11 | 44 |
| Total not taken | 38 | 29 | 33 | 33 | 0 |

By comparing Table 1 with Table 2, the present invention may obtain desired coverage of verification by setting the factors. One of ordinary skill in the art should understand that the verification data, especially debug instructions, for controlling operational flow can be selectively incorporated in the verification program. In some embodiments, loops can be incorporated in the above verification program so as to enhance the coverage of the verification. These modifications all fall within the scope of the present invention.

The following is a description of another embodiment where loops branch instruction are added before the recursion step in the subroutine RECUR. The program code is described below:

```
RECUR      CMP        r9, #2
           LDRGE      r8, = RETURN3
           STMGEFD    r7!, {r8-r10}
           ADD        r8, r9, r10
           SUBGE      r9, r9, #2
           ADDGE      r10, r10, #1
3          CMP        r8, #0
           SUBGT      r8, r8, #1
           BGT        % b3
           CMP        r9, #0
           BGE        RECUR
RETURN3    CMP        r9, #1
           LDRGE      r8, = RETURN2
           STMGEFD    r7!, {r8-r10}
           ADD        r8, r9, r10
           SUBGE      r9, r9, #1
```

-continued

| | | |
|---|---|---|
| 2 | CMP | r8, #0 |
| | SUBGT | r8, r8, #1 |
| | BGT | % b2 |
| | CMP | r9, #0 |
| | BGE | RECUR |
| RETURN2 | CMP | r10, #1 |
| | LDRGE | r8, = RETURN1 |
| | STMGEFD | r7!, {r8-r10} |
| | ADD | r8, r9, r10 |
| | SUBGE | r10, r10, #1 |
| 1 | CMP | r8, #0 |
| | SUBGT | r8, r8, #1 |
| | BGT | % b1 |
| | CMP | r10, #0 |
| | BGE | RECUR |
| RETURN1 | CMP | r10, #1 |
| | LDRGE | r8, = RETURN0 |
| | STMGEFD | r7!, {r8-r10} |
| | ADD | r8, r9, r10 |
| | SUBGE | r10, r10, #1 |
| 0 | CMP | r8, #0 |
| | SUBGT | r8, r8, #1 |
| | BGT | % b0 |
| | CMP | r10, #0 |
| | BGE | RECUR |
| RETURN0 | NOP | |
| | LDMFD | r7!,{r8-r10} |
| | MOV | PC, r8 |

"ADD r8, r9, r10" represents that the factors stored in the registers r9 and r10 are added and the sum is stored in the register r8. "SUBGT r8, r8, #1" deducts the factor stored in the register r8 by 1 if the factor stored in the register r8 is larger than 0 according to the result of "CMP r8, #0". "BGT %b3" returns to the address of the lable "3" when the factor stored in the register r8 is larger than 0 according to the result of "CMP r8, #0". That is, after the data stored in the registers r8-r10 are stored in the stack, the register r8 serves as a loop counter. The initial value is determined by the sum of factors in the registers r9 and r10. Accordingly, several branch instructions have been executed before determining whether to execute the subroutine RECUR. Therefore, various branch instructions which are taken and test patterns are generated to verify the branch instruction prediction mechanism, such as the BTB. Here, the embodiment with the factors 3 and 0 is used. Table 3 is thus obtained by the verification program. Table 3 is the status of the branch instructions of "BGT %b3", "BGT %b2", "BGT %b1" and "BGT %b0" in the present embodiment with factors 3 and 0.

TABLE 3

| Sequence | BGT % b3 | BGT % b2 | BGT % b1 | BGT % b0 |
|---|---|---|---|---|
| 1 | Taken | Taken | Taken | Not taken |
| 2 | Taken | Taken | Not taken | Taken |
| 3 | Taken | Not taken | Not taken | Not taken |
| 4 | Not taken | Taken | Not taken | Not taken |
| 5 | Taken | Not taken | Taken | Not taken |
| 6 | Taken | Not taken | Taken | Taken |
| 7 | Not taken | Not taken | Not taken | Not taken |
| 8 | Taken | Taken | Not taken | Taken |
| 9 | Not taken | Not taken | Taken | Taken |
| 10 | Not taken | Not taken | Not taken | Taken |
| 11 | Not taken | Taken | Not taken | Not taken |
| 12 | Taken | Not taken | Taken | Taken |
| 13 | Not taken | Not taken | Not taken | Not taken |
| 14 | Not taken | Taken | Not taken | Taken |
| 15 | Taken | Taken | Not taken | Taken |
| 16 | Not taken | Taken | Not taken | Not taken |
| 17 | Not taken | Not taken | Not taken | Not taken |
| 18 | Taken | Taken | Not taken | Not taken |

TABLE 3-continued

| Sequence | BGT % b3 | BGT % b2 | BGT % b1 | BGT % b0 |
|---|---|---|---|---|
| 19 | Taken | Not taken | Taken | Taken |
| 20 | Not taken | Not taken | Not taken | Not taken |
| 21 | Taken | Not taken | Taken | Taken |
| 22 | Not taken | Taken | Taken | Taken |
| 23 | Not taken | Taken | Not taken | Not taken |
| 24 | Not taken | Not taken | Taken | Taken |
| 25 | Taken | Taken | Taken | Taken |
| 26 | Not taken | Not taken | Taken | Taken |
| 27 | Not taken | Not taken | Not taken | Not taken |
| Total Taken | 12 | 12 | 12 | 12 |
| Total Not Taken | 15 | 15 | 15 | 1 |
| History = 0, Taken | 5 | 5 | 7 | 7 |
| History = 1, Taken | 3 | 5 | 3 | 3 |
| History = 2, Taken | 3 | 2 | 1 | 1 |
| History = 3, Taken | 1 | 0 | 1 | 1 |
| History = 0, Not taken | 4 | 3 | 6 | 6 |
| History = 1, Not taken | 5 | 5 | 6 | 6 |
| History = 2, Not taken | 3 | 5 | 2 | 2 |
| History = 3, Not taken | 3 | 2 | 1 | 1 |

Assuming the history of each of the branch instructions stored in the BTB has two bits, the verification of the branch instructions for "BGT %b3", "BGT %b2", "BGT %b1" and "BGT %b0" are shown at the bottom part of Table 3. When the factors are set as 4 and 0, the Table 4 is obtained by the verification program. Table 4 is the status of the branch instructions of "BGT %b3", "BGT %b2", "BGT %b1" and "BGT %b0" in the present embodiment with factors 4 and 0.

TABLE 4

| Sequence | BGT % b3 | BGT % b2 | BGT % b1 | BGT % b0 |
|---|---|---|---|---|
| 1 | Taken | Taken | Taken | Not taken |
| 2 | Taken | Taken | Taken | Not taken |
| 3 | Taken | Not taken | Not taken | Not taken |
| 4 | Taken | Taken | Taken | Taken |
| 5 | Not taken | Not taken | Not taken | Taken |
| 6 | Taken | Not taken | Not taken | Not taken |
| 7 | Taken | Not taken | Not taken | Not taken |
| 8 | Taken | Taken | Taken | Taken |
| 9 | Not taken | Not taken | Not taken | Not taken |
| 10 | Taken | Not taken | Not taken | Not taken |
| 11 | Taken | Not taken | Not taken | Not taken |
| 12 | Not taken | Taken | Taken | Taken |
| 13 | Taken | Taken | Not taken | Not taken |
| 14 | Not taken | Taken | Not taken | Not taken |
| 15 | Not taken | Not taken | Not taken | Not taken |
| 16 | Not taken | Taken | Taken | Taken |
| 17 | Taken | Taken | Taken | Not taken |
| 18 | Not taken | Not taken | Not taken | Taken |
| 19 | Not taken | Taken | Not taken | Taken |
| 20 | Not taken | Not taken | Taken | Not taken |
| 21 | Taken | Not taken | Not taken | Not taken |
| 22 | Taken | Not taken | Not taken | Taken |
| 23 | Not taken | Taken | Taken | Not taken |
| 24 | Taken | Not taken | Not taken | Not taken |
| 25 | Not taken | Not taken | Taken | Taken |
| 26 | Not taken | Taken | Taken | Not taken |
| 27 | Not taken | Not taken | Taken | Not taken |
| 28 | Taken | Not taken | Not taken | Not taken |
| 29 | Not taken | Taken | Taken | Taken |
| 30 | Not taken | Not taken | Not taken | Not taken |
| 31 | Taken | Not taken | Not taken | Taken |

TABLE 4-continued

| Sequence | BGT % b3 | BGT % b2 | BGT % b1 | BGT % b0 |
|---|---|---|---|---|
| 32 | Not taken | Not taken | Not taken | Taken |
| 33 | Not taken | Taken | Not taken | Not taken |
| 34 | Taken | Taken | Taken | Taken |
| 35 | Taken | Not taken | Not taken | Taken |
| 36 | Not taken | Taken | Taken | Taken |
| 37 | Taken | Not taken | Taken | Not taken |
| 38 | Not taken | Not taken | Not taken | Not taken |
| 39 | Not taken | Taken | Taken | Taken |
| 40 | Not taken | Not taken | Not taken | Not taken |
| 41 | Taken | Not taken | Not taken | Not taken |
| 42 | Not taken | Not taken | Not taken | Not taken |
| 43 | Not taken | Taken | Not taken | Taken |
| 44 | Taken | Taken | Taken | Not taken |
| 45 | Taken | Not taken | Not taken | Taken |
| 46 | Not taken | Taken | Taken | Taken |
| 47 | Taken | Not taken | Taken | Not taken |
| 48 | Not taken | Not taken | Not taken | Not taken |
| 49 | Not taken | Taken | Taken | Taken |
| 50 | Not taken | Taken | Not taken | Not taken |
| 51 | Taken | Taken | Not taken | Not taken |
| 52 | Not taken | Taken | Not taken | Not taken |
| 53 | Not taken | Not taken | Taken | Not taken |
| 54 | Taken | Taken | Taken | Taken |
| 55 | Taken | Taken | Not taken | Not taken |
| 56 | Taken | Not taken | Not taken | Taken |
| 57 | Not taken | Taken | Taken | Taken |
| 58 | Taken | Not taken | Not taken | Not taken |
| 59 | Taken | Not taken | Not taken | Not taken |
| 60 | Not taken | Not taken | Taken | Taken |
| 61 | Taken | Taken | Not taken | Not taken |
| 62 | Not taken | Not taken | Taken | Not taken |
| 63 | Not taken | Not taken | Not taken | Taken |
| 64 | Not taken | Taken | Not taken | Not taken |
| 65 | Taken | Not taken | Not taken | Not taken |
| 66 | Not taken | Not taken | Not taken | Not taken |
| 67 | Not taken | Taken | Taken | Taken |
| 68 | Taken | Taken | Not taken | Not taken |
| 69 | Not taken | Taken | Taken | Taken |
| 70 | Not taken | Not taken | Taken | Taken |
| 71 | Taken | Taken | Not taken | Not taken |
| 72 | Taken | Not taken | Taken | Taken |
| 73 | Not taken | Not taken | Taken | Taken |
| 74 | Taken | Not taken | Taken | Taken |
| 75 | Not taken | Taken | Not taken | Not taken |
| 76 | Not taken | Taken | Taken | Taken |
| 77 | Not taken | Not taken | Taken | Taken |
| 78 | Taken | Taken | Taken | Taken |
| 79 | Not taken | Not taken | Taken | Taken |
| 80 | Not taken | Not taken | Not taken | Not taken |
| Total Taken | 36 | 36 | 36 | 36 |
| Total Not taken | 44 | 44 | 44 | 44 |
| History = 0, Taken | 14 | 14 | 17 | 19 |
| History = 1, Taken | 10 | 11 | 11 | 9 |
| History = 2, Taken | 7 | 8 | 4 | 3 |
| History = 3, Taken | 5 | 3 | 4 | 5 |
| History = 0, Not taken | 13 | 11 | 14 | 15 |
| History = 1, Not taken | 14 | 14 | 16 | 18 |
| History = 2, Not taken | 10 | 11 | 10 | 8 |
| History = 3, Not taken | 7 | 8 | 4 | 3 |

Comparing Table 3 with Table 4, it is observed that the time and coverage of verification can be determined by setting the factors. In the embodiment with factors 3 and 0, less time is required for verification. In this embodiment where the factors are set as 3 and 0, the whole coverage of the BTB cannot be covered. For example, "history=3, taken" in "BGT %b2" cannot be covered. Referring to Table 4, a longer time for verification is required but an improved coverage for verification can be obtained. Moreover, of the status of whether the branch instructions is taken or not is more random.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A method for verifying a branch instruction prediction mechanism of a processor, the method comprising providing and executing a verification program, the verification program comprising at least one branch instruction for verifying the branch instruction prediction mechanism of the processor, wherein the branch instruction determines whether to use a recursive call and to execute the verification program according to a given condition, and the branch instruction is randomly called by the recursive call to generate various test patterns for verifying the branch instruction prediction mechanism; and determining at least one factor, the factor determining a coverage according to a status of the branch instruction prediction mechanism which is verified by the verification program, wherein the condition refers to identifying a relationship between the factor and a target value.

2. The method of claim 1, wherein the verification program comprises:

identifying the condition;

determining whether to store a next instruction address of the branch instruction and the factor in a stack according to the identified condition;

determining whether to modify the factor according to the identified condition; and executing the branch instruction so as to determine whether to use a recursive call to execute the verification program according to the identified condition.

3. The method of claim 2, wherein the verification program further comprises:

retrieving the next instruction address of the branch instruction and the factor stored in the stack; and returning to the next instruction address of the branch instruction where a verification program is called according to the retrieved next instruction address of the branch instruction.

4. The method of claim 1, wherein the branch instruction prediction mechanism comprises a branch target buffer mechanism.

5. An accessible recording medium for storing a verification program executable in a processor, wherein the verification program is used to verify a branch instruction prediction mechanism of the processor, and the verification program comprises a branch instruction, which determines whether to use a recursive call and to execute the verification program according to a given condition, and the branch instruction is randomly called by the recursive call to generate various test patterns for verifying the branch instruction prediction mechanism, the verification program further comprising setting at least one factor, the factor determining a coverage according to a status of the branch instruction prediction mechanism which is verified by the verification program, the condition referring to identifying a relationship between the factor and a target value.

6. The accessible recording medium of claim 5, wherein the verification program comprises:

identifying the condition;

determining whether to store a next instruction address of the branch instruction and the factor in a stack according to an identified condition;

determining whether to modify the factor according to the identified condition; and determining whether to execute the branch instruction according to the identified condition.

7. The accessible recording medium of claim 6, wherein the verification program further comprises:

retrieving the next instruction address of the branch instruction and the factor stored in the stack; and returning to the next instruction address of the branch instruction where a verification program is called according to the retrieved next instruction address of the branch instruction.

8. The accessible recording medium of claim 5, wherein the branch instruction prediction mechanism comprises a branch target buffer mechanism.

* * * * *